United States Patent [19]

Roscoe et al.

[11] Patent Number: 5,086,224
[45] Date of Patent: Feb. 4, 1992

[54] ANALYSIS OF NUCLEAR DATA FOR DETERMINING CHARACTERISTICS OF EARTH FORMATIONS TRAVERSED BY A BOREHOLE

[75] Inventors: Bradley A. Roscoe, Pasadena; Michael L. Evans, Missouri City, both of Tex.

[73] Assignee: Schlumberger Technology Corporation, Houston, Tex.

[21] Appl. No.: 612,345

[22] Filed: Nov. 13, 1990

[51] Int. Cl.$^5$ .............................................. G01V 5/10
[52] U.S. Cl. .................................. 250/269; 250/270; 364/422
[58] Field of Search .............. 250/270, 269, 266, 267; 364/422

[56] References Cited

U.S. PATENT DOCUMENTS

| | | | |
|---|---|---|---|
| 4,390,783 | 6/1983 | Grau | 250/270 |
| 4,464,569 | 8/1984 | Flaum | 250/270 |
| 4,937,446 | 6/1990 | McKeon et al. | 250/270 |

Primary Examiner—Jack I. Berman
Assistant Examiner—Richard Hanig
Attorney, Agent, or Firm—Henry N. Garrana; Frederic C. Wagret

[57] ABSTRACT

A method for the determination of petrophysical characteristics of earth formation surrounding a borehole, comprising detecting gamma rays or neutrons representative of the formations and forming therefrom a set of detected data "U" which is then expressed as a function of the unknown characteristics "Y", and of a set of response data "S", representative of the conditions under which the detecting step is performed; and wherein "Y" is expressed as r = R Y, where "r" represents prior information independent from the detected data and obtained from other sources, and "R" indicates a set of relationships between at least part of the unknown characteristics. The detected data and response data are e.g. in the form of spectra, and the method may further include irradiating the formation with neutrons or gama rays.

17 Claims, 2 Drawing Sheets

ANALYSIS OF NUCLEAR DATA FOR DETERMINING CHARACTERISTICS OF EARTH FORMATIONS TRAVERSED BY A BOREHOLE

BACKGROUND OF THE INVENTION

1. Field of the Invention

This invention relates to nuclear well logging techniques, wherein a sonde is lowered in a well or borehole and carries out spectral measurements from which are derived information about the composition and/or the physical structure of the earth formation surrounding the well, or the borehole fluid, or the annulus including casing and cement located between the borehole wall and the formation. The invention can also be applied to logging while drilling technique (usually referred to as "LWD") where measurement devices, disposed close to the bottom of a borehole drilling system, perform measurements while the borehole is drilled.

2. Related Art

The nuclear logging or LWD techniques involve analysis of either energy spectra or counts of gamma rays or neutrons representative of atoms of elements in earth formations. Different characteristics of interest of the formation may be derived from such analysis depending on the type of technique involved.

For example, the formation density may be derived from the analysis of the Compton scattering of gamma rays emitted in the borehole by electrons of atoms in the formation, as shown in U.S. Pat. No. 3,900,733 to Seeman and asigned to the assignee of the present application.

Another characteristic, porosity, can be derived from the density measurements. Alternatively, porosity can be obtained from the neutron porosity log technique, such as described in U.S. Pat. No. 4,816,674 assigned to assignee of the present application, wherein the formation is irradiated with fast neutrons which, after a few collisions with atoms, are slowed down to thermal energies (i.e. around 0.025 eV). The slowing rate of neutrons depends to a large extent on the amount of hydrogen in the formation. Thermalized neutrons diffuse randomly until they are captured by chlorine, hydrogen or silicon nuclei which become excited and emit high energy gamma rays hereafter called "capture gamma rays". The neutron porosity log is based on the detection of either the thermalized neutrons by themselves or the capture gamma rays. The counting rate at the detector increases for decreased hydrogen concentration.

According to a further example, analysis of gamma ray spectra resulting from the capture of thermal neutrons, after being decomposed into contributions due to individual atomic elements, usually called "elemental yields", can provide information on lithology. Presence of earth formation elements such as e.g. hydrogen, silicon, calcium, chlorine, sulfur and iron can thus be revealed. An example of capture gamma ray spectra analysis is depicted in U.S. Pat. No. 3,521,064 to Moran et al. A measured gamma ray energy spectrum, representative of a formation of unknown composition, is compared with a composite spectrum constructed from individual laboratory derived standard spectra of the constituents postulated to comprise the formation. The different amounts of the standard spectra (elemental yields) which give the best fit to the measured spectrum, when weighted by each element sensitivity (i.e. the ability of an element to emit gamma rays and those gamma rays to get detected), represent the relative proportion of the constituents of the formation. By appropriate selection of the standards, the proportion of the constituents of interest can be obtained.

A final example is constituted by the spectroscopic method for the determination of hydrocarbon saturation or water saturation, usually called carbon/oxygen method, as depicted e.g. in U.S. Pat. No. 4,937,446 to Roscoe, Stoller and McKeon, assigned to the assignee of the present application.

The trend in the logging industry has always been to combine as much as possible the measurements made in the borehole with information obtained from other sources, e.g. from other logs run in the borehole or core analysis. Such information is hereafter referred to as "prior information".

However, the prior information is usually combined with the actual measurements late in the interpretation process. As a matter of fact, the more independent the prior information is from the actual measurements, the later the prior information is included in the process of the data. Thus, the known methods do not allow the full benefit to be derived from the prior information.

Furthermore, the nuclear measurements are statistical by nature, and thus there is a permanent need for improving the statistical precision of the nuclear measurements.

OBJECTS OF THE INVENTION

A principal object of this invention is to provide a method for analyzing nuclear spectra wherein additional information, obtained independently from other sources, are included in the analysis, thus resulting in an improved statistical precision of the measurements under process.

SUMMARY OF THE INVENTION

According to the invention, these and further objects are attained by a method for the determination of petrophysical characteristics of earth formation surrounding a borehole, comprising:

- detecting nuclear particles representative of the formations and forming therefrom a set of detected data;
- expressing the set of detected data "U" as a function of the unknown characteristics "Y", and of a set of response data "S", representative of the conditions under which the detecting step is performed;
- expressing the unknown characteristics "Y" as $r = Y R$, where "r" represents prior information independent from the detected data and obtained from other sources, and "R" indicates a set of relationships between at least part of the unknown characteristics.

The method of the invention can be applied to spectroscopy measurements, whereas above referred to "U" and "S" are energy spectra.

The method may further include the step of irradiating said formation with nuclear particles, such as neutrons, gamma rays or X-rays, by means of a source disposed in a sonde lowered in said borehole.

According to a first example of implementation, a method for decomposing a gamma ray spectrum representative of earth formation surrounding a borehole, in order to determine the respective gamma ray contribution of each constituent postulated to constitute the formation, comprising:

irradiating the formation with either neutrons or gamma rays by means of a source disposed in a sonde lowered in the borehole;

detecting and counting the gamma rays issued from the formation;

forming an energy spectrum of the detected gamma rays;

establishing a composite spectrum made up of individual standard spectra of the postulated constituents and comprising elemental yields, each elemental yield being representative of the proportion of a given constituent;

expressing the elemental yields as a function of prior information, independent from the detected spectrum, and of a prior information response matrix made of individual elemental responses of the prior information; and determining the best fit between the detected spectrum and the composite spectrum.

The prior information may comprise the borehole size, borehole fluid salinity, mudcake physical properties, formation lithology, porosity, elemental yields from other measurements, casing characteristics, or formation salinity, or any combination thereof or any other relevant parameters. Prior information can also contemplate other independent measurements related to at least part of the unknown characteristics.

The characteristics and advantages of the invention will appear better from the description to follow, given by way of a nonlimiting example, with reference to the appended drawings in which:

DETAILED DESCRIPTION

It has to be born in mind that the invention might be applicable to different kinds of nuclear logging or LWD type measurements. The invention will be hereafter described more particularly in connection with a nuclear logging technique, of the spectroscopy type, involving irradiating the earth formation surrounding a well with neutrons and detecting the gamma rays resulting from the capture of neutrons by the atoms of elements in the formation, such as shown in U.S. Pat. No. 4,464,569 to Flaum, which is assigned to the assignee of the present application and is herein incorporated by reference.

Figure 1:
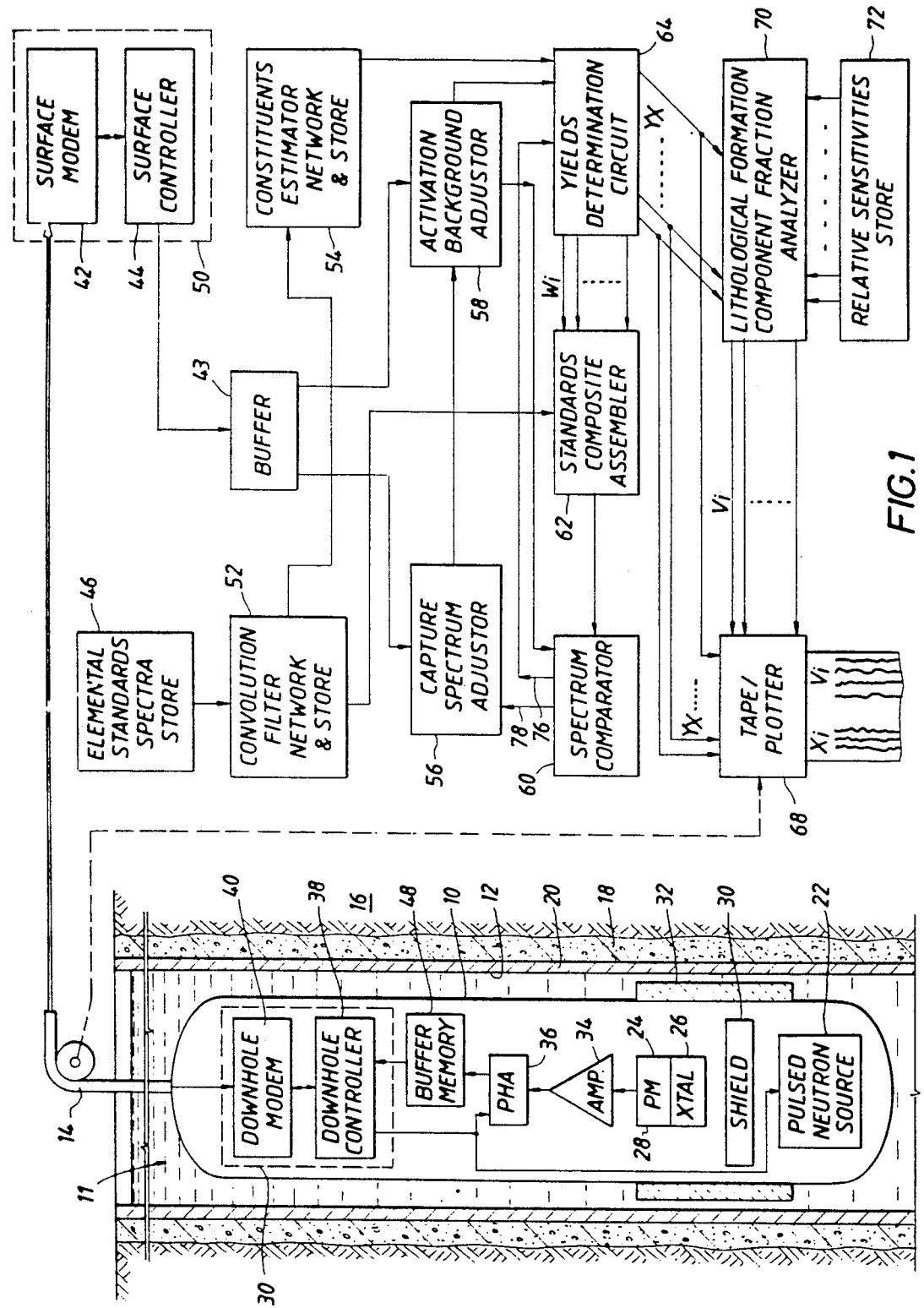
FIG. 1 shows a sonde adapted to be lowered in a well and incorporating the invention.

Referring now to FIG. 1, a representative embodiment of the invention includes a fluid tight pressure and temperature resistant sonde 10 that is adapted to be suspended in a well bore 12 by an armored cable 14 for investigating a subsurface earth formation 16. The well bore 12 is illustrated as cased, including the usual annulus of cement 18 and steel casing 20, and as containing a well fluid 11. It will be understood that the invention as described, but with appropriate adjustments, also has application to openhole logging, i.e. in uncased borehole.

The sonde 10 includes a pulsed neutron source 22 for producing high energy neutrons (also called fast neutrons) for the irradiation of the formation, and at least one radiation detector 24 for the detection of gamma ray radiation returning from the formations. The neutron source 22 preferably is of the accelerator type described in U.S. Pat. Nos. 3,461,291 to C. Goodman or 3,546,512 to A. H. Frentrop, both of which are commonly owned with this application and which are incorporated herein by reference. This type of neutron source is particularly adapted to generate discrete bursts of high energy or fast neutrons, e.g. at 14 MeV, of controlled duration and repetition rate.

The detector 24 may be of any construction appropriate to the detection of gamma rays and to the production of a pulse signal in response to each measured gamma ray having an amplitude representative of the energy of the measured gamma ray. Generally, such a detector includes a scintillation crystal 26 which is optically coupled to a photo-multiplier tube 28. The crystal may be either of the thallium-activated sodium iodide, the thallium- or sodium-activated cesium iodide, the BGO type, or the GSO type. Alternatively, a solid state detector, having for example a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a power source (not shown) at the surface. Suitable power sources (also not shown) are also included in the sonde 10 for the purpose of driving the neutron source 22, the detector 24 and other downhole electronics. The sonde 10 may be surrounded by a boron carbide impregnated sleeve 32 located generally in the region of the source 22 and detector 24. The sleeve 32 acts as a shield to minimize the detection of gamma radiation originating from the neutron interactions in the tool, i.e. in the immediate vicinity of the source and the detector. An amplifier 34 acts on the output pulses from the photo-multiplier 28. The amplified photo-multiplier pulses are thereafter applied to a pulse height analyzer 36 (hereafter referred to as PHA), which may be of any type. It will be understood to include the usual pulse height discriminators, for selecting the gamma ray energy range to be analyzed, and linear gating circuits, for controlling the time portion of the detector signal train to be analyzed.

PHA 36 segregates the detector pulses into predetermined channels according to their amplitude to provide an energy spectrum and supplies signals in suitable digital form representing the amplitude of each analyzed pulse. The digital outputs of PHA 36 are stored in a buffer memory 48 from which they are periodically read out, on demand, by a communications system consisting generally of a downhole communications cartridge 30, the logging cable 14 and a companion surface communications system 50. The combined communications system is a duplex digital system capable of transmitting data at the surface from sonde 10 simultaneously with the transmission of control commands downhole to sonde 10 from a surface control system (not shown). One such communications system is fully described in U.S. Pat. No. 4,355,310 to A. Belaigues, et al, assigned to the assignee of the present invention and herein incorporated by reference. Briefly, the downhole controller 38 organizes the transmission of data in both directions, causing the incoming control signals to be delivered to the proper functional elements and requesting and dispatching outgoing sonde-derived data via downhole modem 40 in a multiplexed mode.

At the surface, the signals are received by the surface communications system 50 consisting of a surface modem 42 which receives the data and transfers it to the surface controller 44 which transmits the data to a surface buffer memory 43, as well as to other functional elements (not shown) as needed.

The operation of the sonde 10 is controlled by control signals originated in the surface control system. These control signals are dispatched downhole by surface controller 44 and surface modem 42. The control signals are used to orchestrate the operation of the various elements of the sonde 10 such as the neutron source 22 and the PHA 36. In response to the control signals, a pulsing circuit, not shown, generates a plurality of sharp pulses, thereby causing the source 22 to emit corresponding sharp bursts of fast neutrons. For purposes of constituent analysis of capture gamma ray spectra, according to the example of implementation of the invention presently described, the neutron bursts are preferably of an optimal duration and are repeated at short intervals that may be adjusted in accordance with variations in the formation thermal decay time to provide satisfactory statistics in the spectrum analysis procedure. U.S. Pat. No. 4,055,763 to S. Antkiw discusses such a technique in detail. Other control signals transmitted to the PHA 36 enable the PHA to operate during a number of detection time periods for each neutron burst.

Since it is desirable, in capture spectral analysis techniques, to obtain as pure a capture gamma ray spectrum as possible, the presence of inelastic gamma ray background is avoided by pulsing the neutron source and by gating the detection of gamma rays so that the detection gate is not coincident with the neutron burst. Additionally, the spectroscopy tool is periodically operated so as to accumulate a background spectrum during a period of time following the decay of most of the thermal neutrons. This background spectrum, which contains primarily contributions from formation and tool material activation (such as the scintillator crystal activation) is subsequently subtracted from gross measured spectra.

Signals representing the measured spectra (representative of the formation under investigation) are assembled and stored in appropriate circuitry such as surface buffer memory 43 for subsequent utilization, which may take place in suitable analog circuitry or in a suitable programmed digital computer such as the PDP-11/34 computer manufactured by the Digital Equipment Corporation, Maynard, Mass.

Before describing in greater detail the particular steps performed in the preferred embodiment of the invention, it is instructive to generally discuss the underlying theory upon which the spectral fitting analysis is based.

The measured spectrum obtained with the PHA 36, is recorded as a histogram. The abscissa is the energy axis which is divided into "m" individual energy intervals or channels; for typical NaI(Tl)-detector resolution, m=256. The "m" energy channels may be of equal width. The ordinate for the $i^{th}$ energy interval is the number (or counts) of gamma-rays accumulated for that energy interval. In the following discussion, the spectra are represented as m-length vectors "U". The components "$U^i$" of each vector "U" are normalized such that the sum of the $U^i$'s is unity over the energy range of interest, which may be narrower than the whole energy range. In general, a formation spectrum as measured can be described as a linear combination of a complete set of "n" individual standard descriptor spectra, $S_j$ (j=1, 2, . . . , n). Each of these individual standard spectra may correspond to a postulated element. i.e. an element expected to be present in the formation. Thus, "n" is the number of constituents postulated to constitute the formation under investigation. The vectors for the standard spectra are mathematically represented by column vectors of an "m×n" composite spectra matrix "S", such that $$U^i = \sum_{j=1}^{n} S_j^i Y_j \tag{1}$$

where "Y" is a vector whose components are the elemental yields $Y_j$ (to be determined) each of which represents the fractional contribution from the corresponding composite spectrum vector, $S_j$, to the measured spectrum U. The most significant spectral-response functions required for the capture spectra are usually for elements, H, Si, Cl, Ca, Na, Fe, and activation background.

Figure 2A:
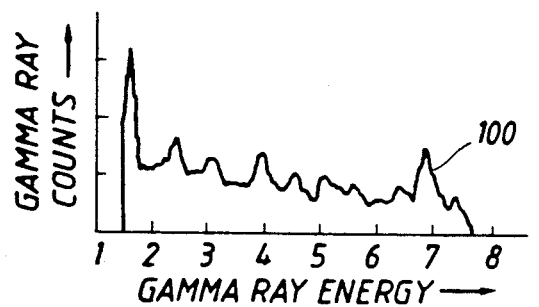
FIG. 2A is a graphical representation of a typical composite gamma ray spectrum along with individual gamma ray spectra for constituents of the composite spectrum.
Figure 2B:
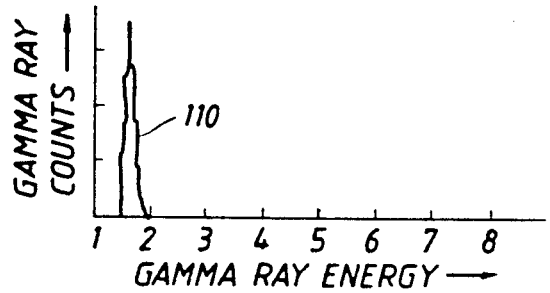
FIG. 2B–2F are graphical representations of individual gamma ray spectra relative each to a constituent of the composite spectrum of FIG. 2A.
Figure 2C:
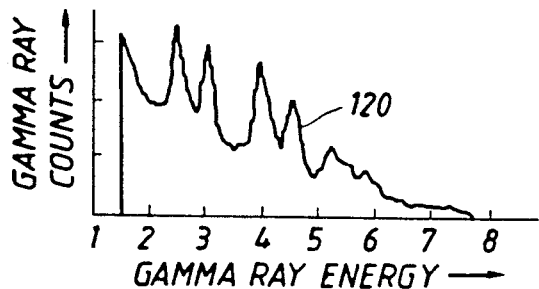
Figure 2D:
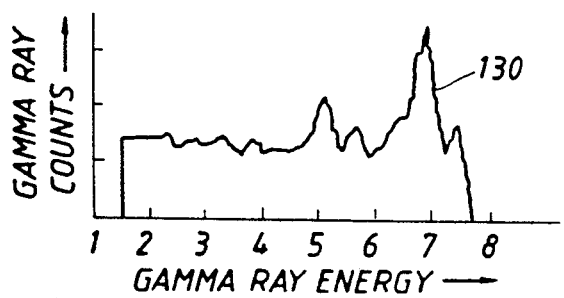
Figure 2E:
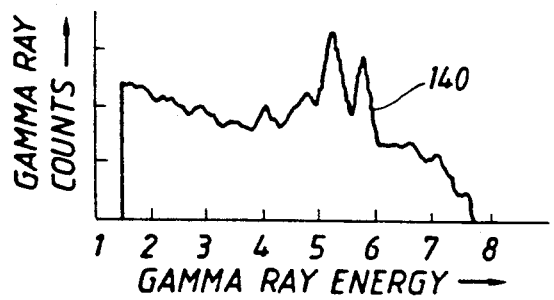
Figure 2F:
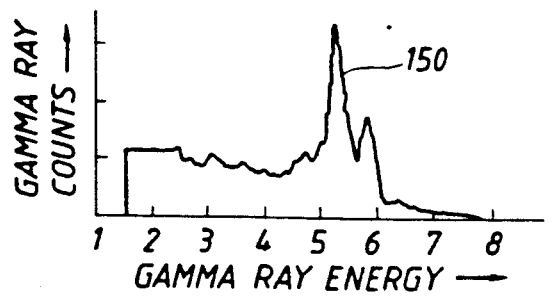

By way of example, FIG. 2A shows a composite gamma ray spectrum 100 made up of a number of individual standard spectra, the identity and spectral distribution of which are known. Each individual standard spectrum corresponds to a given constituent. The relative proportions of the standard spectra, however, including knowledge of their presence or complete absence in any given case, is not known and must be determined in order to provide the necessary information as to the composition of the formation material being analyzed. From a knowledge of the individual standard spectra for silicon dioxide, which is present in sand, or for calcium carbonate, which is found in limestone, therefore, the measured gamma ray spectrum for the unknown formation material adjacent to the well bore may be analyzed to determine the presence and proportion of those constituents. Accordingly, FIGS. 2A, 2B, 2C, 2D, 2E and 2F each illustrates a neutron capture gamma ray spectrum for the respective possible constituents of the particular formation being analyzed, the line 110 representing the hydrogen spectrum, the line 120 being the silicon spectrum, and the line 130 corresponding to the iron spectrum, which, in combination with the spectra for certain other elements (not shown) and that for silicon can be used to indicate the response from limestone or sand formations, and the curve 140 representing the sodium chloride spectrum, measured separately. All of the constituent spectra 110, 120, 130 and 140 in FIGS. 2B-2F are illustrative only and have been normalized to corresponding maximum amplitudes. Consequently, it will be understood that their magnitudes in FIGS. 2B-2F do not add up to the magnitude of the composite spectrum 100 at every energy value, as will be the case in practice. Moreover, as previously indicated, there are other constituent spectra, such as magnesium, sulfur, calcium and the like, not illustrated in FIGS. 2B-2F, which must be unknown formation material if those constituents are believed to be present. Furthermore, it will also be understood that the constituent spectra 110, 120, 130, and 140 are measured in the same manner as will be carried out in the well bore, so that they include any effects resulting from instrumentation.

The general problem of spectroscopy-logging analysis is to determine the contribution of each element to the measured spectrum represented by the elemental yields. Since the standard spectra S, in the form of a "m×n" matrix, is not square because the number of energy channels "m" is greater than the number of constituents "n", it is not possible in general to invert S in order to solve equation (1) for Y. Also, the measured spectrum U contains statistical errors which can be represented by including an error spectrum, E, in equation 1.

$$U = SY + E \quad (2)$$

By selecting a suitable positive symmetric weighting matrix, W, the weighted statistical error squared (i.e. $X^2$) is:

$$X^2 = E^T W E = (U - SY)^T W (U - SY) \quad (3)$$

where $E^T$ is the transpose of E, and $E^T W E$ is representative of the overall weighted error. The weighted-least-squares solution, which minimizes the error in equation 6 is given by:

$$Y = (S^T W S)^{-1} S^T W U \quad (4)$$

The choice of the weighting matrix W determines the nature of the least-squares estimate.

Equation 4 can be rewritten in the form $$Y = LU \quad (5)$$

where $$L = (S^T W S)^{-1} S^T W \quad (6)$$

The matrix, "L" consists of "n" row vectors, "$L_j$" each associated with one of the individual standard $S_j$. The vectors, $L_j$, are called linear estimators because the scalar product between the measured spectrum U and each of the vectors, $L_j$, gives the fractional contribution or yield $Y_j$, of the $j^{th}$ element to the measured spectrum.

To generate the set of standard spectra $S_j$, for use in the standard matrix S, standard capture spectra are taken in special laboratory formations designed to emphasize the spectral contribution of each postulated constituent.

As discussed above, each individual standard spectra leads to the generation of an associated linear estimator $L_j$ whose shape reflects the character of the standard and the cross correlations between it and other standards. Thus, the estimator is a type of digital filter that extracts from the measured spectrum U the contribution from its associated composite spectrum. The estimators include both positive and negative components. The positive and negative components occur where a standard correlates with one or more other standards. Returning now to FIG. 1, the elemental standard spectra, originally obtained from known test formations, are held in store 46. Convolution filter network 52, as depicted in U.S. Pat. No. 4,934,574 to Grau and Hertzog, assigned to the assignee of the present invention, causes the elemental standard spectra to be degraded in a manner which takes into account the effects of temperature on the detector resolution. The degraded standard spectra are next utilized to generate an equal number of constituent or linear estimators in constituent estimator network 54. The estimators which have been defined above (see equation 5 and 6) as linear estimators whose scalar products with a spectrum give the fractional contributions or elemental yields of specific elements to the measured spectrum are stored in element 54 so as to be available for subsequent process steps hereafter described.

To determine the composition of earth formation 16 surrounding the well 12, the magnitude of the measured spectra is compared at different energy intervals with a composite spectrum made up of all the individual standard spectra, normalized relative to one another by yield or amplitude, and representing the relative proportions of the corresponding constituents. The mathematical statement of the criterion used to establish the best "fit" permits the determination of the elemental yields to be applied to the composite spectrum supposed to match the measured spectrum. The elemental concentrations or the constituents may further be derived from these elemental yields in a known manner, such as described in U.S. Pat. No. 4,390,783 to Grau, incorporated herein by reference.

In order to determine the best fit between the composite spectra and the measured spectra, it is necessary to match the parameters representative of the conditions under which the respective measured and composite spectra have been obtained. A first parameter is the resolution degradation factor (hereafter referred to as RDF) which is representative of the effects of the variation from one detector to the other, or of the effects due to the processing electronics downstream from the detector, or finally of the temperature. A second and a third parameter are the gain and the offset which are characteristic of the electronic components used to obtain both measured and composite spectra. A fourth parameter is the background subtraction factor (hereafter referred to as BSF). This list of parameters is given for illustrative purpose and is not exhaustive; e.g. a further parameter may be a parameter representative of the non linearity of the gain. The best fit is determined through minimizing a given function of both measured and composite spectra while modifying the elemental yields and the above mentioned parameters. By way of example, one minimizes $X^2$, i.e. the weighted sum of the squares of the deviation of the fitting function (composite spectrum) and the measured function (measured spectrum). The minimum condition for $X^2$ can be formulated as:

$$X^2 = \sum_i \frac{\left( \sum_j y_j S_j^i(\alpha) + b B^i(\beta) - U^i \right)^2}{V^i} = \min. \quad (7)$$

where "$B^i$" is the background spectrum (acquired e.g. during the measurements in the borehole); "b" is BSF; "$\alpha$" represents the changes in gain, offset and RDF to be applied to the composite spectrum so these parameters match those of the measured spectrum; "$\beta$" stands for the gain, offset and RDF parameters of the background spectrum with respect to the measured spectrum and "$V^i$" is the variance spectrum which can be expressed as: $V^i = 1/W^i$.

The first step is to subtract the activation background spectrum from the gross measured spectrum. The second step consists in correcting the measured spectrum for the different parameters such as gain, offset. The corrected measured spectrum is then, according to the third step, transmitted to circuit 64 which also receives the constituent estimators stored in memory 54. Circuit 64. called yields determination circuit, multiplies each of the estimators with the adjusted capture spectrum to derive a plurality of trial yields $Y_j$ which are subsequently used in element 62 to assemble a composite spectrum from the plurality of convolved standard spectra drawn from convolution filter network and store 52.

The composite spectrum and the measured spectrum (adjusted as hereabove described) are then compared in spectrum comparator 60 and a value of goodness of fit derived. If the goodness of fit value, (e.g. $\chi^2$), is optimum, yields determination circuit 64 is instructed via communication line 76 to output its data to tape plotter 68, or some other recording device such as a magnetic tape drive. In this final form, data from circuit 64 are the fractional contributions or relative spectral yields $Y_j$ of the various elements "j". If the goodness of fit is not satisfactory, a control signal is sent from spectrum comparator 60 via communication line 78 to the capture spectrum adjustor circuit 56 and the entire process is repeated with a different capture spectrum parameter (gain and/or offset). The above described process is iteratively repeated until an appropriate least squares fitting criterion (or some other acceptable criterion) is met. General information concerning the hereabove described processing of composite spectrum and measured spectrum can be found in U.S. Pat. No. 4,464,569 already referred to.

According to the invention, the characteristic spectrum "Y" including the elemental yields (see equation 1) is expressed as a function of prior information obtained independently from the measured spectrum "U". Prior information is constituted by any kind of data which are related to the earth formation under investigation. E.g. prior information could comprise borehole size, borehole fluid salinity, mudcake physical projects, formation lithology, porosity, or any combination thereof or any other parameters related to the casing or the formation. The prior information may be derived from independent measurements carried out in the borehole or from core analysis.

More specifically, in matrix form:

$$r = YR \tag{8}$$

where "r" is a matrix including the prior information, and "R" is a matrix including given relationships between at least two of the unknown characteristics; these relationships being representative of the prior information. Thus "r" is the unknown.

For illustration purpose, hereafter is an example of expression for equation 8:

$$\begin{pmatrix} 0.5 \\ 1 \\ 1.5 \\ 0.8 \end{pmatrix} = \begin{pmatrix} Si \\ H \\ Ca \\ Cl \end{pmatrix} \begin{pmatrix} 1000 \\ 0100 \\ 0010 \\ 0001 \end{pmatrix}$$

where the figures in the matrix "r" express the prior information obtained from other sources.

Equations 4 and 8 give (based on a least square method):

$$Y = (S^T W S + R^T P^{-1} R)^{-1} (S^T W U + R^T P^{-1} r) \tag{9}$$

where "P" is the variance matrix for the prior information. In other words, each element of the matrix P weights the corresponding prior information "r". As a further definition, P might be considered as the representation, in matrix form, of the level of "confidence" given to prior information, such as the precision range, e.g. plus or minus 5%.

The error on the determination of "Y" may be obtained from the error matrix "E":

$$E = (S^T W S + R^T P^{-1} R)^{-1} \tag{10}$$

Equation 7 is solved, i.e. the best fit between the measured spectrum and the composite spectrum may be determined, by any known method such as a least squares linear fitting technique, as hereabove described. In an alternate embodiment, the best fit may be performed using a non linear technique, such as depicted in U.S. patent application filed in the names of B. Roscoe and Stoller, on Aug. 7, 1990 under Ser. No. 564,251, which is assigned to the assignee of the present application and is herein incorporated by reference.

The sonde 10 may, in a further embodiment, comprise two gamma ray detectors, in order to determine the hydrocarbon saturations in the earth formation, as depicted in U.S. Pat. No. 4,937,446 to Roscoe, Stoller and McKeon. Using a two detector sonde, the above described process of determining the elemental yields is carried out for each detector. Information derived from both detectors may also be combined to derive the oil saturation $S_o$ in the formation and the oil fraction $C_b$ in the borehole, as described in the pending patent application filed on May 9, 1990, Ser. No. 07/521,804 in the name of B. Roscoe and C. Stoller, and which is commonly owned with the present application and herein incorporated by reference.

The invention can as well be applied to the neutron porosity technique for the determination of earth formation porosity, wherein fast neutrons are emitted and collide with atoms and are slowed down to thermal energies (i.e. around 0.025 eV), such as described in U.S. Pat. No. 4,816,674 to Ellis, Flaum and Scott. Prior information could e.g. consist of borehole size or salinity, mud weight and thickness, formation salinity or porosity, casing size and weight, or any other appropriate parameter related to the borehole constituents, the formation and the casing.

According to another example, the invention may be applied to the determination of earth formation density, derived from the analysis of the Compton scattering of gamma rays emitted in the well by electrons of atoms in the formation, as shown in U.S. Pat. No. 3,900,733 to Seeman and assigned to the assignee of the present application. Prior information could be, in this application, mud density or thickness.

According to a further example, the invention can be applied to natural gamma ray detection in order to determine the content of U, Th and K in the formation, such as described in U.S. Pat. No. 3,976,878 to Chevalier and Seeman which is assigned to the assignee of the present application and is herein incorporated by reference. Prior information may be based on the knowledge of a given percentage of concentration of thorium for example.

Generally speaking, the invention is applicable to any kind of nuclear measurement where the detected or measured data "U" can be expressed as: $U = S Y$, where "S" is a set of response data representative of the detection step, i.e. the sonde and the external conditions (temperature). and "Y" is representative of the unknown characteristics.

Although the invention has been described herein with reference to a specific embodiment, many modifications and variations therein will readily occur to those skilled in the art.

What is claimed is:

1. A method for the determination of petrophysical characteristics of earth formation surrounding a borehole, comprising:

detecting nuclear particles representative of said formations and forming therefrom a set of detected data;

expressing said set of detected data "U" as a function of said unknown characteristics "Y", and of a set of response data "S", representative of the conditions under which said detecting step is performed; and expressing said unknown characteristics "Y" as r = Y R, where "r" represents prior information independent from said detected data and obtained from other sources, and "R" indicates a set of relationships between at least part of said unknown characteristics.

2. The method according to claim 1 wherein said detected data and response data are in the form of spectra.

3. The method according to claim 1 further including the step of irradiating said formation with nuclear particles, such as neutrons, gamma rays or X-rays, by means of a source disposed in a sonde lowered in said borehole.

4. The method according to claim 1 wherein said prior information comprises the borehole size, borehole fluid salinity, mudcake physical properties, formation lithology, porosity, casing parameters, mud characteristics or any combination thereof.

5. The method according to claim 1 wherein said prior information comprises measurements related to at least one of said unknown characteristics and independent from said detected data.

6. A method for decomposing a gamma ray spectrum representative of earth formation surrounding a borehole, in order to determine the respective gamma ray contribution of each constituents postulated to constitute said formation, comprising:

detecting and counting the gamma rays issued and representative from said formation;

forming an energy spectrum of said detected gamma rays;

establishing a composite spectrum made up of individual standard spectra of said postulated constituents and comprising elemental yields, each elemental yield being representative of the proportion of a given constituent;

expressing the elemental yields as a function of prior information independent from said detected spectrum, and of a prior information response matrix made of individual elemental responses of said prior information; and determining the best fit between said detected spectrum and said composite spectrum.

7. The method according to claim 6 wherein said prior information comprises the borehole size, borehole fluid salinity, mudcake physical properties, formation lithology, porosity, mud and/or casing characteristics, or any combination thereof.

8. The method according to claim 1 wherein said detected particles are gamma rays.

9. An apparatus for the determination of petrophysical characteristics of earth formation surrounding a borehole, comprising:

means for detecting nuclear particles representative of said formations and forming therefrom a set of detected data;

means for expressing said set of detected data "U" as a function of said unknown characteristics "Y", and of a set of response data "S", representative of the conditions under which said detecting means operates; and means for expressing said unknown characteristics "Y" as r = Y R, where "r" represents prior information independent from said detected data and obtained from other sources, and "R" indicates a set of relationships between at least part of said unknown characteristics.

10. The apparatus according to claim 9 further comprising means for irradiating said formation with nuclear particles, such as neutrons or gamma rays, by means of a source disposed in a sonde lowered in said borehole.

11. The apparatus according to claim 10 wherein said irradiating particles are neutrons.

12. An apparatus for decomposing a gamma ray spectrum representative of earth formation surrounding a borehole, in order to determine the respective gamma ray contribution of each constituents postulated to constitute said formation, comprising:

means for detecting and counting the gamma rays issued from said formation;

means for forming an energy spectrum of said detected gamma rays;

means for establishing a composite spectrum made up of individual standard spectra of said postulated constituents and comprising elemental yields, each elemental yield being representative of the proportion of a given constituent;

means for expressing the elemental yields as a function of prior information, independent from said detected spectrum, and of a prior information response matrix made of individual elemental responses of said prior information; and means for determining the best fit between said detected spectrum and said composite spectrum.

13. The apparatus according to claim 9 wherein said prior information comprises the borehole size, borehole fluid salinity, mudcake physical properties, formation lithology, porosity, or mud and/or casing parameters or any combination thereof.

14. The apparatus according to claim 12 wherein said prior information comprises the borehole size, borehole fluid salinity, mudcake physical properties, formation lithology, or porosity, or any combination thereof.

15. The apparatus according to claim 9 wherein said detected particles are gamma rays.

16. The apparatus according to claim 9 further comprising a neutron source.

17. The apparatus according to claim 12 further comprising a neutron source.

* * * * *